United States Patent
Cha et al.

(10) Patent No.: US 10,173,619 B2
(45) Date of Patent: Jan. 8, 2019

(54) ADJUSTABLE REAR BUMPER SPOILER SYSTEM FOR VEHICLE

(71) Applicant: HYUNDAI MOTOR COMPANY, Seoul (KR)

(72) Inventors: Dong Eun Cha, Seongnam-si (KR); Hyun Gyung Kim, Hwaseong-si (KR); Keon Soo Jin, Ulsan (KR); Jin Young Yoon, Gimpo-si (KR); Ki Hong Lee, Seoul (KR)

(73) Assignee: HYUNDAI MOTOR COMPANY, Seoul (KR)

(*) Notice: Subject to any disclaimer, the term of this patent is extended or adjusted under 35 U.S.C. 154(b) by 14 days.

(21) Appl. No.: 15/374,123

(22) Filed: Dec. 9, 2016

(65) Prior Publication Data

US 2018/0009402 A1    Jan. 11, 2018

(30) Foreign Application Priority Data

Jul. 8, 2016  (KR) .......................... 10-2016-0086573

(51) Int. Cl.
*B60R 19/48*    (2006.01)
*B62D 35/00*    (2006.01)
*B60R 19/02*    (2006.01)

(52) U.S. Cl.
CPC ............ *B60R 19/48* (2013.01); *B60R 19/023* (2013.01); *B62D 35/007* (2013.01); *B60R 2019/486* (2013.01); *Y02T 10/88* (2013.01)

(58) Field of Classification Search
CPC . B60R 19/48; B60R 19/023; B60R 2019/486; B62D 35/007; Y02T 10/88

USPC ...................................................... 296/180.5
See application file for complete search history.

(56) References Cited

U.S. PATENT DOCUMENTS

| | | | |
|---|---|---|---|
| 7,481,482 B2 | 1/2009 | Grave et al. | |
| 8,308,222 B2* | 11/2012 | Ondracek | B62D 37/02 296/180.1 |
| 2015/0166130 A1* | 6/2015 | Lee | B60R 19/38 296/180.5 |

FOREIGN PATENT DOCUMENTS

| KR | 1998-0073747 A | 11/1998 |
| KR | 10-2005-0099314 A | 10/2005 |
| KR | 10-1526735 B1 | 6/2015 |

OTHER PUBLICATIONS

Notice of Allowance dated May 22, 2017 of corresponding Korean Patent Application No. 10-2016-0086573—2 pages.

* cited by examiner

*Primary Examiner* — Joseph D. Pape
*Assistant Examiner* — Dana D Ivey
(74) *Attorney, Agent, or Firm* — Knobbe Martens Olson & Bear LLP

(57) ABSTRACT

An adjustable rear bumper spoiler system for a vehicle controls air turbulence by driving the air spoiler device so that the vehicle can be pressed downwards during high-speed driving. The adjustable rear bumper spoiler system also controls air turbulence by driving flap devices so that the vehicle body is pressed downwards with respect to the turning direction during turning. This consequently improves the driving performance and driving reliability of the vehicle.

17 Claims, 6 Drawing Sheets

ADJUSTABLE REAR BUMPER SPOILER SYSTEM FOR VEHICLE

CROSS REFERENCE TO RELATED APPLICATION

The present application claims priority to Korean Patent Application No. 10-2016-0086573, filed Jul. 8, 2016, the entire contents of which is incorporated herein for all purposes by this reference.

BACKGROUND

Field

The present invention generally relates to an adjustable rear bumper spoiler system for a vehicle.

Description of the Related Art

A vehicle running at a high speed compresses a portion of air, thereby causing a turbulent flow of the air. The turbulent flow produced in this manner lowers the stability and driving performance of the vehicle, which is problematic. To overcome this problem, rear spoilers have recently been introduced. A rear spoiler controls air turbulence in the rear of a vehicle to increase pressure with which the vehicle can be more reliably pressed downwards to the road, thereby improving the driving reliability and driving performance of the vehicle.

The disclosure of this section is to provide background of the invention. Applicant notes that this section may contain information available before this application. However, by providing this section, Applicant does not admit that any information contained in this section constitutes prior art.

SUMMARY

One aspect of the present invention provides an adjustable rear bumper spoiler system for a vehicle, the adjustable rear bumper spoiler system being able to control air turbulence depending on whether a vehicle is driving at a high speed or is turning, thereby improving the driving performance and driving reliability of the vehicle.

According to one aspect of the present invention, an adjustable rear bumper spoiler system for a vehicle may include: a rear bumper having a left through-hole and a right through-hole formed symmetrically about a lateral center of a vehicle body; flap devices disposed on the rear bumper, in positions corresponding to the left through-hole and the right through-hole, to selectively open and close the left through-hole and the right through-hole; and a controller controlling the flap devices and receiving steering-related information, wherein, in a turning of a vehicle, the controller controls the flap devices to open the left through-hole or the right through-hole corresponding to a direction of left or right turning.

One or more left through-holes of the left through-hole and one or more right through-holes of the right through-hole may be formed symmetrically in a lower portion of the rear bumper.

Each of the flap devices may include: a flap cover fixed to a back beam such that an accommodation space is formed therein, the flap cover having a driving motor; and a flap panel rotatably disposed in the accommodation space of the flap cover and connected to the driving motor to rotate using power delivered from the driving motor.

The accommodation space of the flap cover may be divided into a top space and a bottom space. The flap panel may include a top panel rotatably disposed in the top space and a bottom panel rotatably disposed in the bottom space and connected to the driving motor, the top panel and the bottom panel being connected to each other via a link unit.

One portion of the bottom panel may be rotatably connected to the bottom space, and the opposite portion of the bottom panel may form a rotation shaft connected to the driving motor, with a bottom connecting portion of the bottom panel extending perpendicular to the rotation shaft. One portion of the top panel may be rotatably connected to the top space, and the opposite portion side of the top panel may be perpendicularly bent to form a top connecting portion. The link unit may be disposed on the driving motor and may be rotatably connected to the bottom connecting portion and the top connecting portion.

The link unit may include a first link rotatably disposed on the driving motor and a second link, both ends of the second link being rotatably connected to the bottom connecting portion and the top connecting portion, and the first link being rotatably connected to a central portion of the second link.

When the vehicle is not determined to turn, the controller may not control the flap devices so that the left through-hole and the right through-hole are closed.

The adjustable rear bumper spoiler system may further include a spoiler device disposed on the rear bumper to be movable up and down, wherein the spoiler device is positioned to face the left through-hole and the right through-hole and is moved downwards under control of the controller to protrude downwards from the rear bumper.

The spoiler device may include: a driving motor fixed to the back beam; a linkage rotating using power delivered from the driving motor; and a spoiler panel connected to the linkage to move up and down using power delivered from the driving motor, thereby being parked in close contact with a bottom surface of the rear bumper or being withdrawn downwards from the rear bumper.

The driving motor may include a driving shaft extending in a lateral direction and connected to the linkage. The linkage may include: driving links connected to both ends of the driving shaft to rotate along with the driving shaft; fixed links connected to the spoiler panel; follower links having both ends rotatably connected to the driving links and the fixed links to deliver rotating force from the driving links to the fixed links; and support links having both ends rotatably connected to the fixed links and the back beam to support the spoiler panel when the spoiler panel is withdrawn.

The controller may control the spoiler device and receive information regarding a speed of the vehicle. When the speed of the vehicle arrives at a previously-stored set speed, the controller may control the spoiler device to be moved and withdrawn downwards.

The controller may receive information regarding a speed of the vehicle. When a rate of deceleration due deceleration of the speed of the vehicle has arrived at a previously-stored set rate of deceleration, the controller may control the spoiler device to be moved and withdrawn downwards.

The controller may control the flap devices to operate along with turning of the vehicle after the spoiler device is driven.

The adjustable rear bumper spoiler system for a vehicle having the above-described configuration can control air turbulence by driving the air spoiler device so that the vehicle can be pressed downwards during high-speed driving. It is also possible to control air turbulence by driving the flap devices so that the vehicle body is pressed downwards with respect to the turning direction during turning. It is thereby possible to improve the driving performance and driving reliability of the vehicle.

BRIEF DESCRIPTION OF THE DRAWINGS

The above and other features and other advantages of the present invention will be more clearly understood from the following detailed description when taken in conjunction with the accompanying drawings, in which.

DETAILED DESCRIPTION OF EMBODIMENTS

Figure 1:
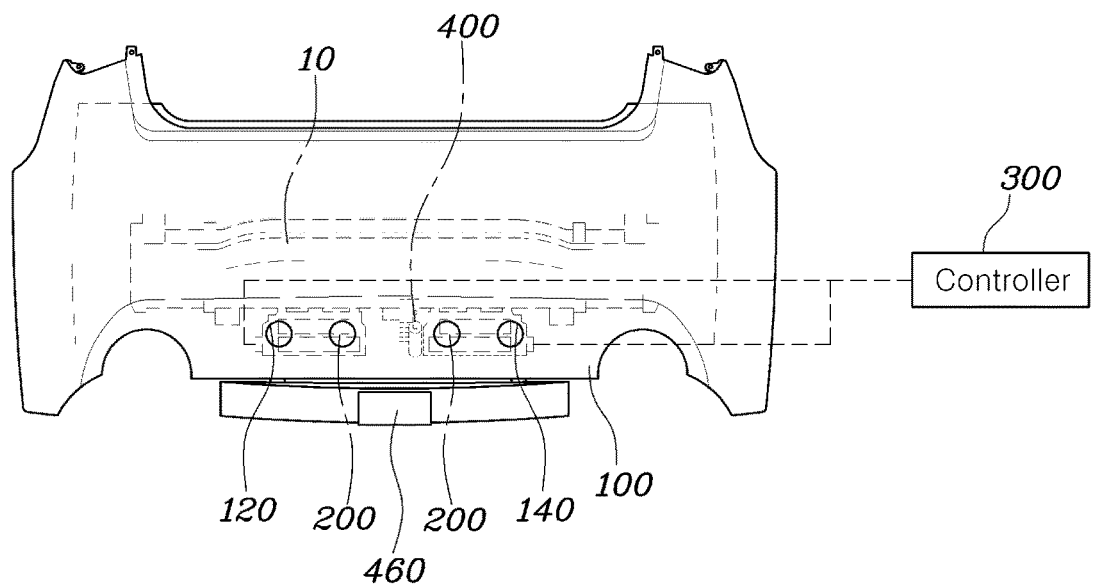
FIG. 1 illustrates an adjustable rear bumper spoiler system for a vehicle according to an embodiment of the present invention.

Hereinafter, embodiments of an adjustable rear bumper spoiler system for a vehicle according to embodiments of the present invention will be described in detail with reference to the accompanying drawings. Throughout the drawings, the same reference numerals will refer to the same or like parts.

A rear spoiler of a vehicle is a device that modifies air flow around the vehicle. The rear spoiler system in embodiments actively responds to driving conditions of the vehicle. In embodiments, referring to FIGS. 1 and 5-8, the rear spoiler system includes an articulable rear spoiler device 400 that is configured to form two or more different configurations. In embodiments, the rear spoiler 460 is connected one or more articulable arms 440 that changes the position and/or orientation of the rear spoiler 460.

In embodiments, the rear spoiler system further includes at least one through hole formed in a body (e.g., rear bumper 100) next to the rear spoiler 460. In embodiments, the rear spoiler 460 covers the at least one through hole when the rear spoiler 460 is not deployed. In embodiments, the at least one through hole is exposed when the rear spoiler 460 is deployed to modify air flow around the vehicle. In embodiments, the rear spoiler system further includes at least one baffle that is selectively open or close the at least one through hole. The at least one baffle or flap device 200 is located behind the rear bumper 100 such that the rear bumper 100 is interposed between the at least one baffle 200 and the rear spoiler 460.

In embodiments, the at least one through hole includes at least one left through hole 120 and at least one right through hole 140 when viewing the vehicle from the back. In embodiments, the at least one baffle 200 includes at least one left baffle configured to block the at least one left through hole 120. In embodiments, the at least one baffle 200 includes at least one right baffle configured to block the at least one right through hole 140. In embodiments, each side has the same number of through holes and the same number of baffles. In embodiments, each baffle is connected to a mechanism to move the baffle between a blocking position that blocks at least one corresponding through hole and an opening position that unblocks the at least one corresponding through hole. As illustrated in the drawings, in embodiments, each baffle blocks or unblocks two or more through holes.

In embodiments, the vehicle or its controller(s) controls the position of the baffles 200 relative to their corresponding through holes 120 or 140 in view of the driving of the vehicle while the rear spoiler 460 is deployed, and the at least one through hole is exposed. In embodiments, selective opening and closing of the at least one through hole by the control of the baffles further modifies air flow around the vehicle in addition to the airflow modification by the rear spoiler. In embodiments, the baffles are controlled at least based on the speed, steering or both.

In embodiments, during the vehicle's travel in a straight direction, all the baffles 200 block their corresponding through holes 120 and 140. In embodiments, when the vehicle turns to the right, at least part of the right-side through holes 140 is open while all the left-side through holes is closed. In embodiments, when turning to the right, all the right-side baffles open their corresponding through holes while all or part of the left-side baffles closes their corresponding through holes. This is to balance traction of the left and right sides of the vehicle when turning to right. In embodiments, when turning to the left, at least part of the left-side through holes is open while all the right-side through holes is closed. In embodiments, when turning to the right, all the left-side baffles open their corresponding through holes while all or part of the right-side baffles closes their corresponding through holes. This is to balance traction of the left and right sides of the vehicle when turning to left.

Figure 2:
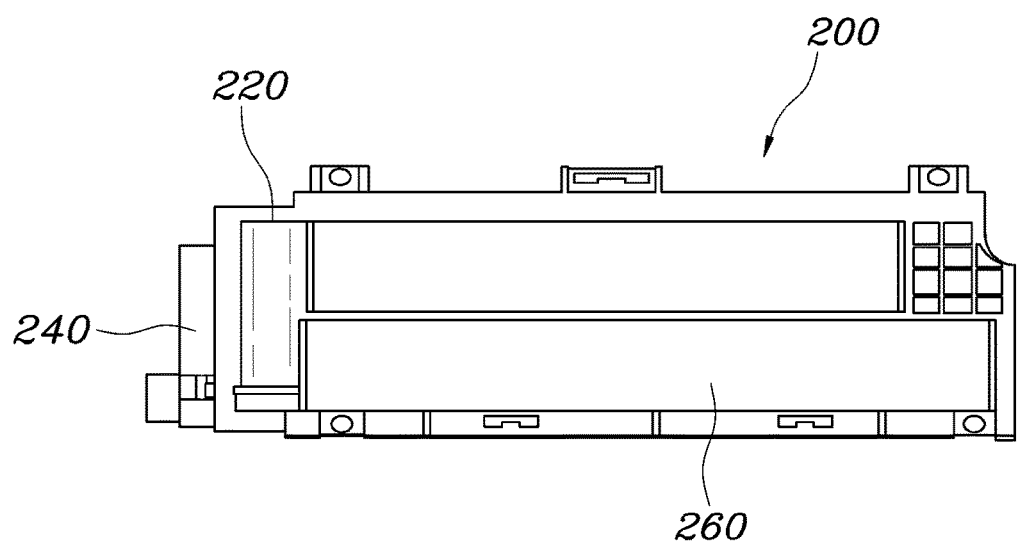
FIGS. 2 to 4 illustrate the flap device of the adjustable rear bumper spoiler system for a vehicle illustrated in FIG. 1.
Figure 3:
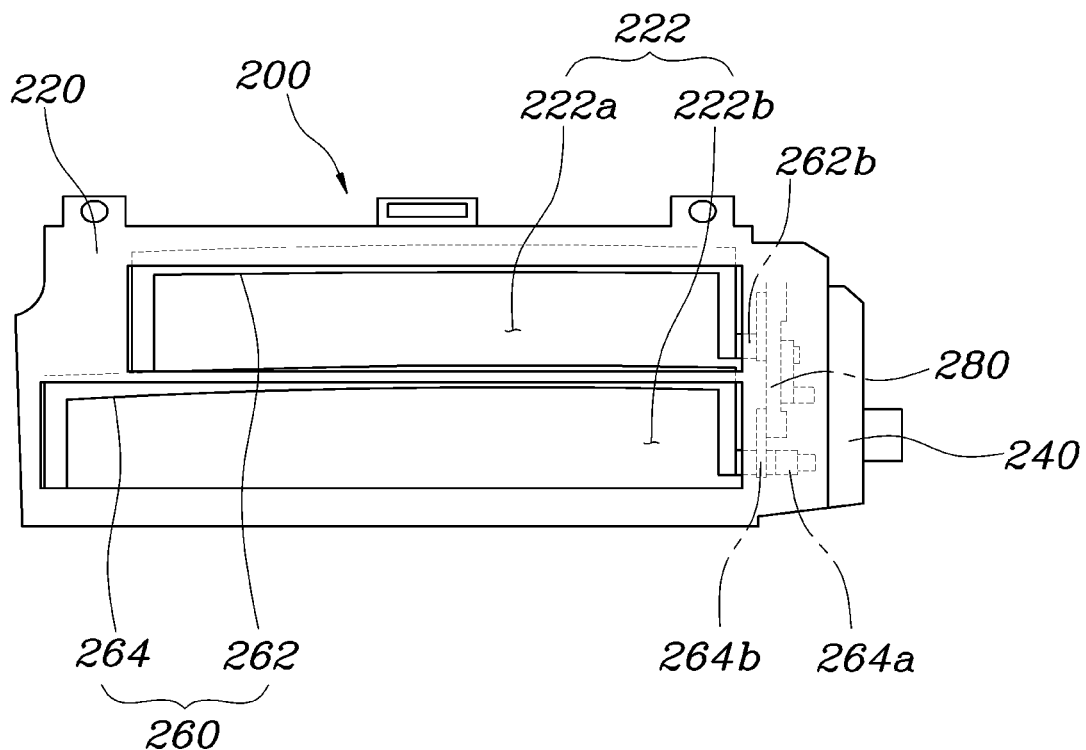
Figure 4:
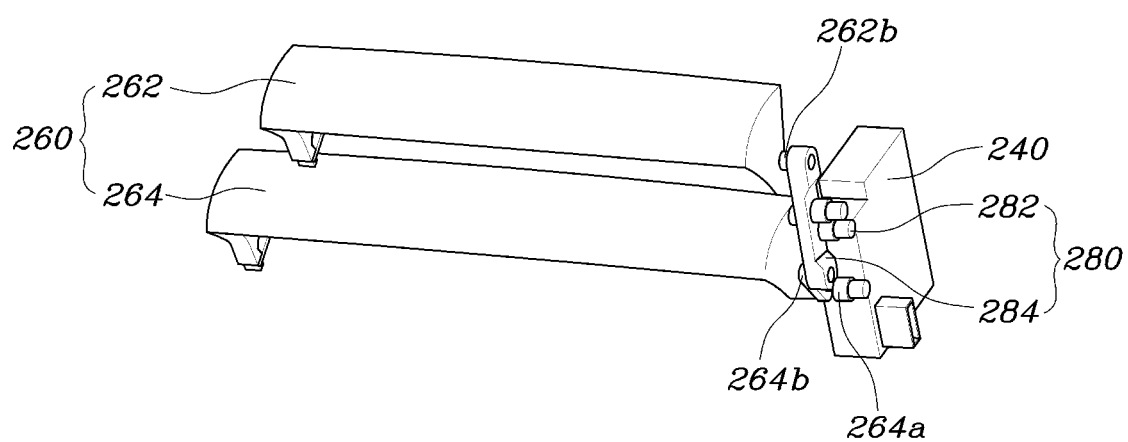
Figure 5:
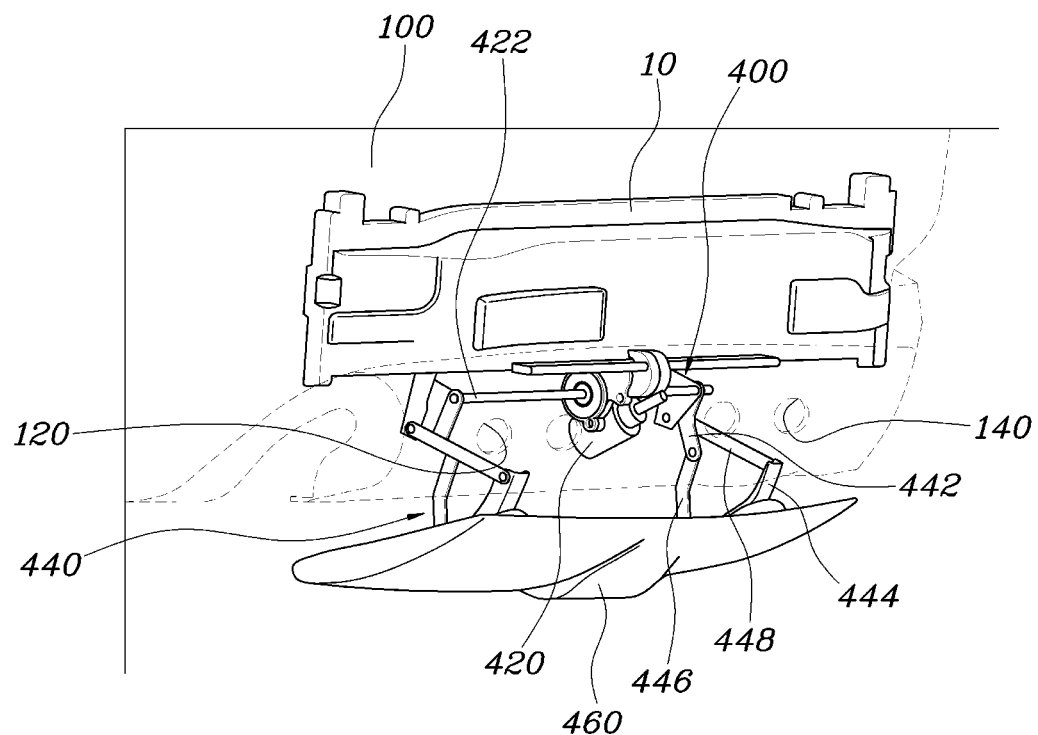
FIG. 5 illustrates a spoiler device of the adjustable rear bumper spoiler system for a vehicle illustrated in FIG. 1.

Embodiments are further discussed below in reference with the drawings. FIG. 1 illustrates an adjustable rear bumper spoiler system for a vehicle according to an embodiment of the present invention, FIGS. 2 to 4 illustrate the flap device of the adjustable rear bumper spoiler system for a vehicle illustrated in FIG. 1, and FIG. 5 illustrates a spoiler device of the adjustable rear bumper spoiler system for a vehicle illustrated in FIG. 1.

Figure 6:
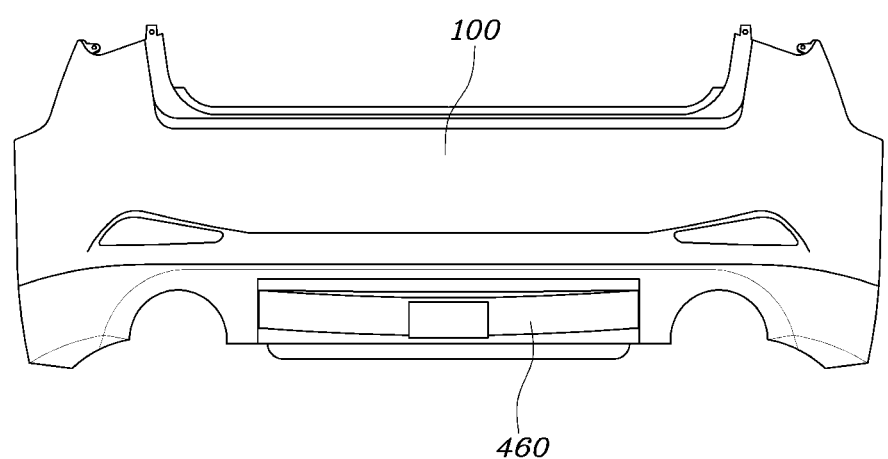
FIGS. 6 to 8 illustrate the operation of the adjustable rear bumper spoiler system for a vehicle illustrated in FIG. 1.
Figure 7:
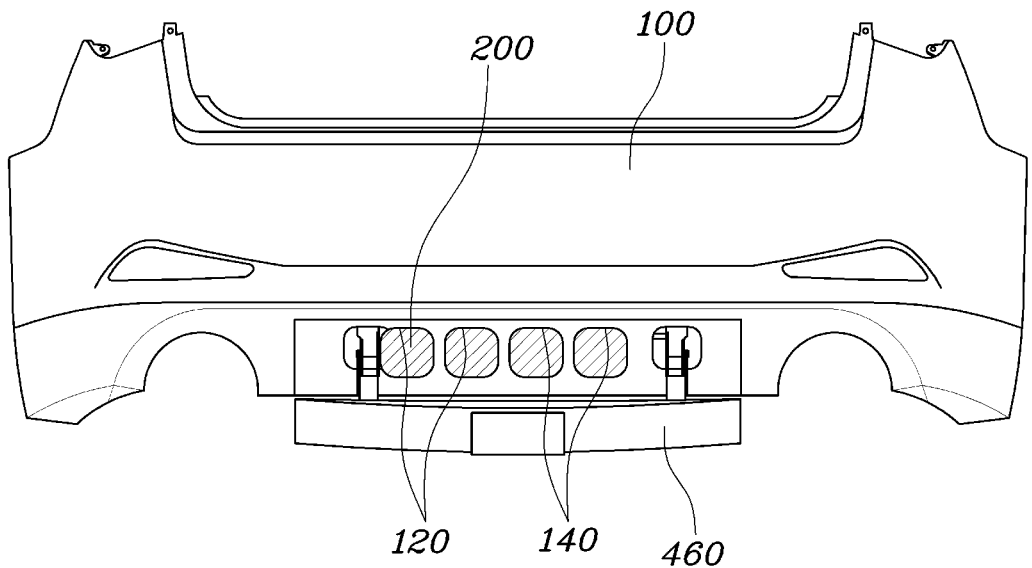
Figure 8:
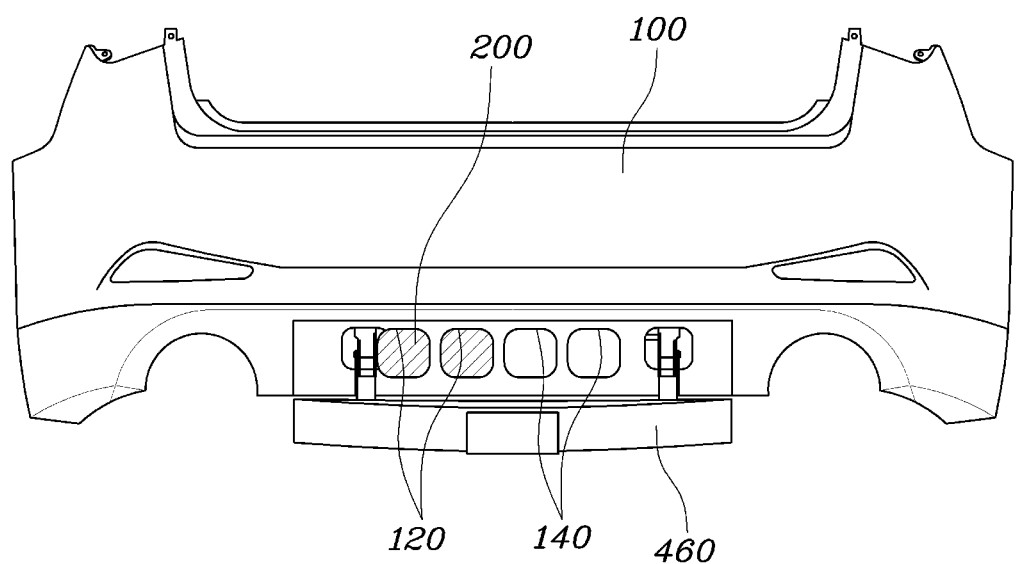
Figure 9:
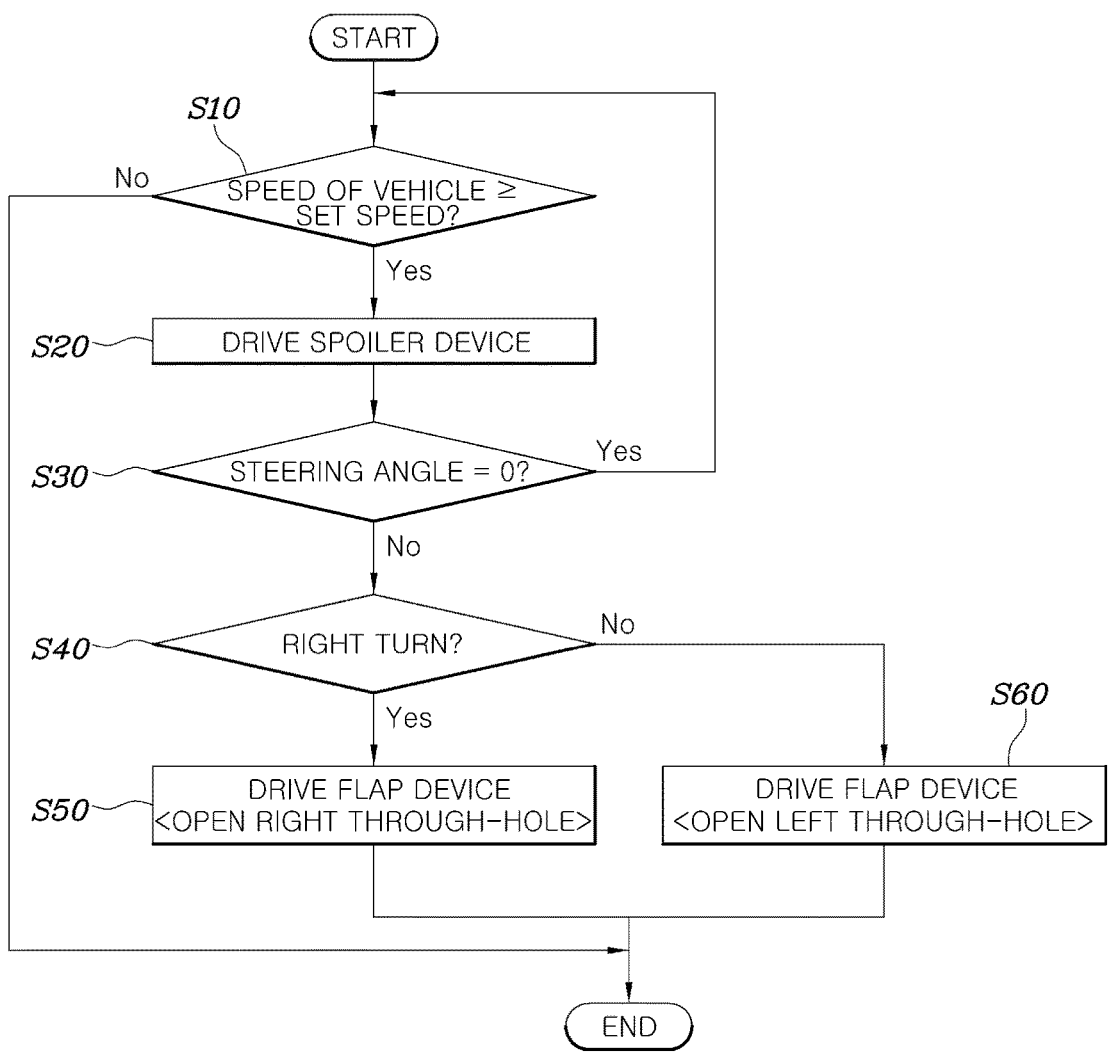
FIG. 9 is a flowchart illustrating a control method of an adjustable rear bumper spoiler system for a vehicle according to a first embodiment of the present invention.
Figure 10:
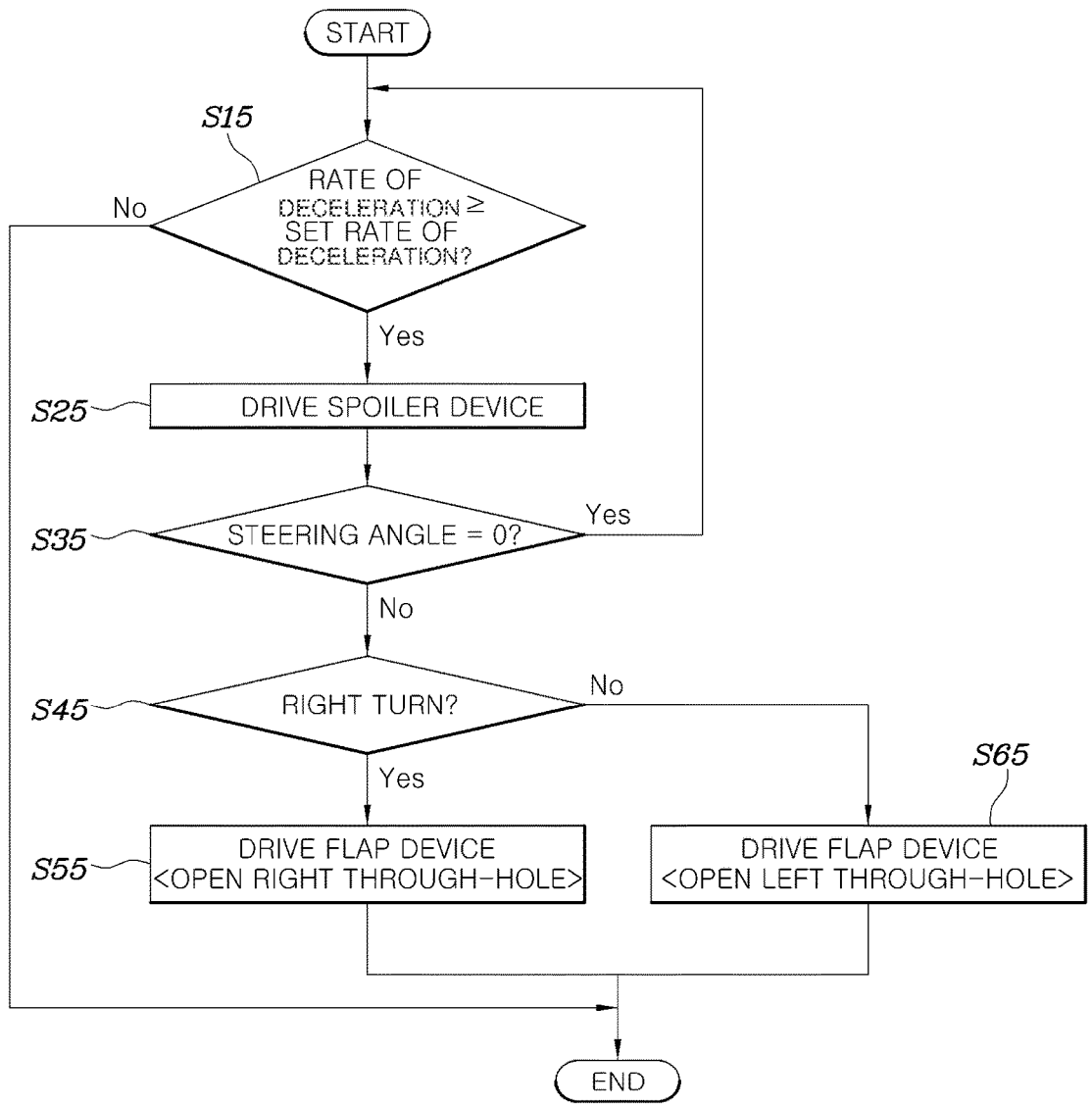
FIG. 10 is a flowchart illustrating a control method of an adjustable rear bumper spoiler system for a vehicle according to a second embodiment of the present invention.

FIGS. 6 to 8 illustrate the operation of the adjustable rear bumper spoiler system for a vehicle illustrated in FIG. 1, FIG. 9 is a flowchart illustrating a control method of an adjustable rear bumper spoiler system for a vehicle according to a first embodiment of the present invention, and FIG. 10 is a flowchart illustrating a control method of an adjustable rear bumper spoiler system for a vehicle according to a second embodiment of the present invention.

As illustrated in FIG. 1, the adjustable rear bumper spoiler system for a vehicle according to embodiments of the present invention includes: a rear bumper 100 having a left through-hole 120 and a right through-hole 140 formed symmetrically about the lateral center of a vehicle body; flap devices 200 disposed on the rear bumper 100, in positions corresponding to the left through-hole 120 and the right through-hole 140, to selectively open and close the left through-hole 120 and the right through-hole 140; and a controller 300 controlling the flap devices 200 and receiving steering-related information, wherein, in turning of a vehicle, the controller 300 controls the flap devices 200 to open the left through-hole 120 or the right through-hole 140 corresponding to the left or right turning direction. When it is not determined that the vehicle turns, the controller 300 does not control the flap devices 200 so that the left through-hole 120 and the right through-hole 140 are closed, whereby an influence on air turbulence during the driving of the vehicle is minimized.

Since the left through-hole 120 and the right through-hole 140 are formed in the rear bumper 100 according to embodiments of the present invention, it is possible to control turbulence using air flowing through the through-holes. In embodiments, at least one left through-hole 120 and at least one right through-hole 140 can be formed symmetrically in the lower portion of the rear bumper 100. Since the left through-hole 120 and the right through-hole 140 are formed in the lower portion of the rear bumper 100, am atmospheric pressure difference can be created using air flowing in the lower direction of the vehicle. In addition, a sufficient amount of airflow may be obtained by forming a plurality of left through-holes 120 and a plurality of right through-holes 140.

The flap devices 200 controlled by the controller 300 are provided on the rear bumper 100 as a means for controlling air turbulence flowing through the left through-hole 120 and the right through-hole 140. The controller 300 is able to collect information regarding the turning direction of the vehicle from a steering sensor. When the vehicle turns left, the controller 300 controls the flap devices 200 so that the left through-hole 120 is opened. When the vehicle turns right, the controller 300 controls the flap devices 200 so that the right through-hole 140 is opened. Thus, during the turning of the vehicle, the flap devices 200 open the left through-hole 120 or the right through-hole 140 corresponding to the turning direction, whereby the vehicle can turn in a stable position without being raised by a pressure difference due to air flowing through the left through-hole 120 or the right through-hole 140.

Specifically describing the flap devices 200 according to embodiments of the present invention, as illustrated in FIGS. 1 and 2, each of the flap devices 200 includes: a flap cover 220 fixed to a rear beam 10 such that an accommodation space 222 is formed therein, the flap cover 220 having a driving motor 240; and a flap panel 260 rotatably disposed in the accommodation space 222 of the flap cover 220 and connected to the driving motor 240 to rotate using power delivered from the driving motor 240.

In embodiments, the flap covers 220 of the flap devices 200 are disposed on the rear beam 10, in portions of the rear bumper 100 facing the left through-hole 120 and the right through-hole 140. With this configuration, the flap panels 260 disposed in the accommodation spaces 220 are disposed in the left through-hole 120 and the right through-hole 140 to open and close the left through-hole 120 and the right through-hole 140. The flap panels 260 are fan-shaped and rotate using power delivered from the driving motor 240 to open and close the left through-hole 120 or the right through-hole 140.

More specifically, as illustrated in FIGS. 3 and 4, the accommodation space 222 of the flap cover 220 is divided into a top space 222a and a bottom space 222b, while the flap panel 260 includes a top panel 262 rotatably disposed in the top space 222a and a bottom panel 264 rotatably disposed in the bottom space 222b and connected to the driving motor 240. The top panel 262 and the bottom panel 264 can be connected to each other via a link unit 280.

The accommodation space 222 of the flap cover 220 may be formed as a single accommodation space, and the flap panel 260 having a single-piece structure may be accommodated in the single accommodation space. However, when the through-hole is opened and closed using the single-piece flap panel 260, there may be a danger of fracture and a problem in durability, since the single-piece flap panel 260 supports strong wind pressure during high-speed driving.

Thus, the accommodation space 222 of the flap cover 220 is divided into the top space 222a and the bottom space 222b, and the flap panel 260 has a two-piece structure including the top panel 262 disposed in the top space 222a and the bottom panel 264 disposed in the bottom space 222b. This configuration can provide a sufficient support even in the case in which strong wind pressure is applied. Although the top panel 262 and the bottom panel 264 are separated from each other, the top panel 262 and the bottom panel 264 are connected to each other via the link unit 280 such that both the top panel 262 and the bottom panel 264 can be rotated using the single driving motor 240.

With this configuration, when the bottom panel 264 rotates in response to the operation of the driving motor 240, the top panel 262 connected to the bottom panel 264 via the link unit 280 can rotate together with the bottom panel 262.

More specifically, as illustrated in FIG. 4, one portion of the bottom panel 264 is rotatably connected to the bottom space 222b, and the opposite portion of the bottom panel 264 forms a rotation shaft 264a connected to the driving motor 240, with a bottom connecting portion 264b extending perpendicular to the rotation shaft 264a. One portion of the top panel 262 is rotatably connected to the top space 222a, and the opposite portion side of the top panel 262 is perpendicularly bent to form a top connecting portion 262b. The link unit 280 is disposed on the driving motor 240 and is rotatably connected to the bottom connecting portion 264b and the top connecting portion 262b.

In embodiments, one portion of the bottom panel 262 is rotatably hinge-connected to one portion of the bottom space 222b, and the opposite portion of the bottom panel 262 is connected to the driving motor 240 via the rotation shaft 264a, such that the bottom panel 264 rotates in the bottom space 222b when the driving motor 240 operates. In embodiments, the bottom connecting portion 264b perpendicularly extends from the rotation shaft 264a, and is connected to the link unit 280.

One portion of the top panel 262 is rotatably hinge-connected to one portion of the top space 222a, and the top connecting portion 262b is perpendicularly bent and extends from the opposite portion of the top panel 262. In embodiments, the link unit 280 is connected to the top connecting portion 262b, allowing the top panel 262 to rotate along with the rotation of the bottom panel 262.

In embodiments, the link unit 280 includes a first link 282 rotatably disposed on the driving motor 240, and a second link 284. Both ends of the second link 284 are rotatably connected to the bottom connecting portion 264b and the top connecting portion 262b, and the first link 282 is rotatably connected to the central portion of the second link 284. The first link 282 may be rotatably disposed on the driving motor 240 or may be disposed on the driving motor 240 to receive the same amount of power together with the bottom panel 264 from the driving motor 240. Both ends of the second link 284 are rotatably connected to the bottom connecting portion 264b of the bottom panel 264 and the top connecting portion 262b of the top panel 262. In particular, the first link 282 is rotatably connected to the central portion of the second link 284. When the bottom panel 246 rotates in response to the operation of the driving motor 240, the second link 284 moves following the direction in which the bottom panel 264 rotates, whereby the top panel 262 connected to the second link 284 via the top connecting portion 262b can rotate together with the bottom panel 264. Thus, the position and length of the first link 282 can be set based on the radius of rotation by which the point at which the bottom connecting portion 264b is connected to the second link 284 rotates when the bottom panel 264 rotates.

According to embodiments of the present invention, as illustrated in FIGS. 1 and 5, the adjustable rear bumper spoiler system for a vehicle further includes a spoiler device 400 disposed on the rear bumper 100 to be movable up and down. The spoiler device 400 is positioned to face the left through-hole 120 and the right through-hole 140 and is moved downwards under the control of the controller 300 to protrude downwards from the rear bumper 100. In embodiments of the present invention, the spoiler is disposed to be movable up and down below the rear bumper 100. This can control the turbulence of air flowing below the vehicle body, thereby improving aerodynamic performance, and prevents the spoiler from being exposed externally, thereby obtaining the degree of freedom of design.

The spoiler device 400 includes: a driving motor 420 fixed to the rear beam 10, a linkage 440 rotating using power delivered from the driving motor 420, and a spoiler panel 460 connected to the linkage 440 to move up and down using power delivered from the driving motor 420, whereby the spoiler panel 460 can be parked in close contact with the bottom surface of the rear bumper 100 or be withdrawn downwards from the rear bumper 100.

In embodiments, the spoiler panel 460 may be positioned to face the left through-hole 120 and the right through-hole 140 of the rear bumper 100 and extend in the lateral direction to close the left through-hole 120 and the right through-hole 140. The spoiler panel 460 is moved up and down by power delivered through the linkage 440 from the driving motor 420 disposed on the back beam 10. The driving motor 420 operates under the control of the controller 300.

Describing the spoiler device 400 in more detail, as illustrated in FIG. 5, the driving motor 240 has a driving shaft 422 extending in the lateral direction and connected to the linkage 440. The driving shaft 422 rotates in response to the operation of the driving motor 420 to rotate the linkage 440, which will be described later, thereby moving the spoiler panel 460 upwards and downwards. Referring to FIG. 5, the flap device 200 is omitted and the spoiler device 400 is illustrated, since only the spoiler device 400 is intended to be described.

In addition, the linkage 440 includes: driving links 442 connected to both ends of the driving shaft 422 to rotate along with the driving shaft 422; fixed links 444 connected to the inner surfaces of the spoiler panel 460 to control the angle at which the spoiler panel 460 is withdrawn; follower links 446 having both ends rotatably connected to the driving links 442 and the fixed links 444 to deliver rotating force from the driving links 442 to the fixed links 444; and support links 448 having both ends rotatably connected to the fixed links 444 and the back beam 10 to support the spoiler panel 460 when the spoiler panel 460 is withdrawn.

The driving links 442 may be formed to be shorter than the follower links 446 to minimize tracks along which the driving links 442 move when the spoiler panel 460 is parked. In addition, the driving links 442 and the follower links 446 have concave shapes, with middle portions between both ends protruding forward. This configuration prevents the withdrawn spoiler panel 460 from being rotated by wind pressure.

The support links 448 may be positioned outward of the spoiler panel 460 with respect to the driving links 442 and the follower links 446. The support links 448 support the fixed links 444 in the position in which the spoiler panel 460 is withdrawn, thereby being able to generate supporting force against wind pressure produced on the spoiler panel 460.

The spoiler device 400 as described above operates under the control of the controller 300. The controller 300 controls the spoiler device 400 and receives information regarding the speed of the vehicle. When the speed of the vehicle arrives at a set speed that is previously stored, the controller 300 can control the spoiler device 400 so that the spoiler panel 460 is moved and withdrawn downwards.

In embodiments, the controller 300 can collect information regarding the speed of driving of the vehicle using a speed sensor. When the speed of the vehicle has arrived at the previously-stored set speed, the controller 300 controls the spoiler panel 460 to be moved and withdrawn downwards. The set speed previously stored in the controller 300 is a value indicating that the speed of the vehicle is a high speed. The set speed may be determined differently depending on vehicles. When the vehicle is determined to be running at a high speed due to the speed of the vehicle having arrived at the set speed, the controller 300 controls air turbulence by withdrawing the spoiler panel 460 so that the vehicle is pressed downward due to the difference in pressure caused by flows of air, thereby enabling reliable high-speed driving.

The controller 300 receives information regarding the speed of the vehicle, and when the rate of deceleration due the deceleration of the speed of the vehicle has arrived at a previously-stored set rate of deceleration, controls the spoiler device 400 to move and withdraw the spoiler panel 460 downwards. In embodiments, the set rate of deceleration previously stored in the controller 300 is a value indicating that the speed of the vehicle is rapidly decreasing due to abrupt braking of the vehicle. When the rate of deceleration arrives at the set rate of deceleration, the controller 300 determines that the vehicle is being abruptly braked and controls the spoiler panel 460 to be withdrawn. When the spoiler panel 460 is withdrawn, the vehicle body is pressed by the difference of pressure caused by flows of air, so that the vehicle can drive reliably.

In embodiments of the present invention, the controller 300 can control the flap devices 200 to operate along with the turning of the vehicle after the spoiler device 400 is operated. The spoiler is typically designed to improve aerodynamic performance during high-speed driving. Since the spoiler panel 460 of the spoiler device 400 according to embodiments of the present invention is positioned to face the left through-hole 120 and the right through-hole 140 disposed on the rear bumper 100, the controller 300 has the sequence of operation by which the flap devices 200 operate after the spoiler device 400 is moved downwards.

In embodiments, when the speed of the vehicle has not arrived at the previously-stored set speed, the controller 300 controls the spoiler device 400 so that the spoiler panel 460 remains parked on the rear bumper 100, as illustrated in FIG. 6. When the speed of the vehicle has arrived at the previously-stored set speed, the controller 300 controls the spoiler device 400 so that the spoiler panel 460 is moved and withdrawn downwards from the rear bumper 100, as illustrated in FIG. 7.

In this position, when it is determined that the vehicle turns, the controller 300 controls the flap devices 200 so that the left through-hole 120 or the right through-hole 140 corresponding to the left turning direction or the right turning direction of the vehicle is opened. In embodiments, as illustrated in FIG. 8, when the vehicle is determined to be turning right, the controller 300 controls the flap devices 200 to open the right through-hole 140. This can consequently improve aerodynamic performance during high-speed driving and turning, thereby improving driving reliability and driving performance.

The above-described adjustable rear bumper spoiler system for a vehicle according to embodiments of the present invention can be controlled as follows.

As illustrated in FIG. 9, a control method of an adjustable rear bumper spoiler system for a vehicle according to a first embodiment of the present invention includes: step S10 of determining whether or not the speed of a vehicle has arrived at a previously-stored set speed; and step S20 of driving the spoiler device 400 when the speed of a vehicle has arrived at the set speed. In sequence, step S30 of determining whether or not the vehicle turns is performed. The manipulation of the steering wheel or the angle of steering may be checked to determine whether or not the vehicle turns. Then, step S40 of determining whether the vehicle turns left or right is performed. When the vehicle turns right, step S50 of opening the right through-hole 140 formed in the rear bumper by driving the flap devices 200 is performed. When the vehicle turns left, step S60 of opening the left through-hole 120 is performed.

As illustrated in FIG. 10, a control method of an adjustable rear bumper spoiler system for a vehicle according to a second embodiment of the present invention includes: step S15 of determining whether or not the rate of deceleration of the vehicle has arrived at a previously-stored set rate of deceleration; and step S25 of driving the spoiler device 400 when the rate of deceleration has arrived at the set rate of deceleration. In sequence, step S35 of determining whether or not vehicle turns is performed, and then step S45 of determining whether the vehicle turns right or left is performed. When the vehicle turns right, step S55 of opening the right through-hole 140 formed in the rear bumper by driving the flap devices 200 is performed. When the vehicle turns left, step S75 of opening the left through-hole 120 is performed.

As set forth above, the adjustable rear bumper spoiler system for a vehicle according to embodiments of the present invention can control air turbulence by driving the spoiler device 400 during the high-speed driving of the vehicle so that the vehicle body can be pressed downwards during high-speed driving, thereby improving aerodynamic performance and driving performance.

In addition, during the turning of the vehicle, the left through-hole 120 or the right through-hole 140 corresponding to the direction of left or right turning is opened in response to the operation of the flap devices 200 to control air turbulence so that the vehicle body is pressed downwards with respect to the turning direction, whereby the vehicle can turn in a reliable manner.

Although embodiments of the present invention have been described for illustrative purposes, those skilled in the art will appreciate that various modifications, additions and substitutions are possible, without departing from the scope and spirit of the present invention as disclosed in the accompanying claims.

What is claimed is:

1. A rear spoiler system for a vehicle, the system comprising:
    a rear bumper comprising a left through-hole and a right through-hole;
    a left flap configured to move for selectively blocking or unblocking the left through-hole;
    a right flap configured to move for selectively blocking or unblocking the right through-hole;
    a controller configured to control movement of the left and right flaps,
    wherein when the vehicle is turning right, the controller is configured to control the movement of the right flap from blocking the right through-hole to unblocking the right through-hole,
    whereas when the vehicle is turning left, the controller is configured to control the movement of the left flap from blocking the left through-hole to unblocking the left through-hole.

2. The system according to claim 1, wherein the left through-hole the right through-hole are formed in a lower portion of the rear bumper.

3. The adjustable rear bumper spoiler system according to claim 1, further comprising a spoiler device disposed on the rear bumper to be movable up and down, wherein the spoiler device is positioned to face the left through-hole and the right through-hole and is moved downwards under control of the controller to protrude downwards from the rear bumper.

4. The adjustable rear bumper spoiler system according to claim 3, wherein the spoiler device comprises:
    a driving motor fixed to the back beam;
    a linkage rotating using power delivered from the driving motor; and
    a spoiler panel connected to the linkage to move up and down using power delivered from the driving motor, thereby being parked in close contact with a bottom surface of the rear bumper or being withdrawn downwards from the rear bumper.

5. The adjustable rear bumper spoiler system according to claim 4,
    wherein the driving motor comprises a driving shaft extending in a lateral direction and connected to the linkage, and
    wherein the linkage comprises:
    driving links connected to both ends of the driving shaft to rotate along with the driving shaft;
    fixed links connected to the spoiler panel;
    follower links having both ends rotatably connected to the driving links and the fixed links to deliver rotating force from the driving links to the fixed links; and
    support links having both ends rotatably connected to the fixed links and the back beam to support the spoiler panel when the spoiler panel is withdrawn.

6. The adjustable rear bumper spoiler system according to claim 3, wherein the controller controls the spoiler device and receives information regarding a speed of the vehicle, and when the speed of the vehicle arrives at a previously-stored set speed, controls the spoiler device to be moved and withdrawn downwards.

7. The adjustable rear bumper spoiler system according to claim 3, wherein the controller receives information regarding a speed of the vehicle, and when a rate of deceleration due deceleration of the speed of the vehicle has arrived at a previously-stored set rate of deceleration, controls the spoiler device to be moved and withdrawn downwards.

8. The adjustable rear bumper spoiler system according to claim 3, wherein the controller controls the flap devices to operate along with turning of the vehicle after the spoiler device is driven.

9. The system according to claim 1, wherein when the vehicle is driving straight, the controller is configured to control the left and right flaps such that the left through-hole and the right through-hole are blocked.

10. The system according to claim 1, wherein the left flap and the right flap are interposed between the rear bumper and a rear beam of the vehicle.

11. The system according to claim 1, wherein the left through-hole and the right through-hole symmetrical about a lateral center of the vehicle.

12. The system according to claim 1, further comprising at least one driving motor configured to rotate the left flap and the right flap, wherein the controller is configured to control the at least one driving motor using information from a steering sensor of the vehicle.

13. An adjustable rear bumper spoiler system for a vehicle, the system comprising:
- a rear bumper having a left through-hole and a right through-hole formed symmetrically about a lateral center of a vehicle body;
- flap devices dispose over the rear bumper, in positions corresponding to the left through-hole and the right through-hole, to selectively open and close the left through-hole and the right through-hole; and
- a controller configured to control the flap devices and receive steering-related information, wherein, in a turning of a vehicle, the controller configured to control the flap devices to open the left through-hole or the right through-hole corresponding to a direction of left or right turning,
- wherein each of the flap devices comprises:
  - a flap cover fixed to a back beam such that an accommodation space is formed therein, the flap cover having a driving motor; and
  - a flap panel rotatably disposed in the accommodation space of the flap cover and connected to the driving motor to rotate using power delivered from the driving motor.

14. The adjustable rear bumper spoiler system according to claim 13,
- wherein the accommodation space of the flap cover is divided into a top space and a bottom space, and
- wherein the flap panel comprises a top panel rotatably disposed in the top space and a bottom panel rotatably disposed in the bottom space and connected to the driving motor, the top panel and the bottom panel being connected to each other via a link unit.

15. The adjustable rear bumper spoiler system according to claim 14,
- wherein one portion of the bottom panel is rotatably connected to the bottom space, and the opposite portion of the bottom panel forms a rotation shaft connected to the driving motor, with a bottom connecting portion of the bottom panel extending perpendicular to the rotation shaft,
- wherein one portion of the top panel is rotatably connected to the top space, and the opposite portion side of the top panel is perpendicularly bent to form a top connecting portion, and
- wherein the link unit is disposed on the driving motor and is rotatably connected to the bottom connecting portion and the top connecting portion.

16. The adjustable rear bumper spoiler system according to claim 15, wherein the link unit comprises a first link rotatably disposed on the driving motor and a second link, both ends of the second link being rotatably connected to the bottom connecting portion and the top connecting portion, and the first link being rotatably connected to a central portion of the second link.

17. An adjustable rear bumper spoiler system for a vehicle, the system comprising:
- a rear bumper having a left through-hole and a right through-hole formed symmetrically about a lateral center of a vehicle body;
- flap devices disposed over the rear bumper, in positions corresponding to the left through-hole and the right through-hole, to selectively open and close the left through-hole and the right through-hole; and
- a controller configured to control the flap devices and receive steering-related information, wherein, in a turning of a vehicle, the controller configured to control the flap devices to open the left through-hole or the right through-hole corresponding to a direction of left or right turning,
- wherein, when the vehicle is not determined to turn, the controller is configured not to control the flap devices so that the left through-hole and the right through-hole are closed.

* * * * *